US012470021B2

(12) United States Patent
Yan et al.

(10) Patent No.: US 12,470,021 B2
(45) Date of Patent: Nov. 11, 2025

(54) ADAPTER

(71) Applicant: ROSENBERGER ASIA PACIFIC ELECTRONIC CO., LTD., Beijing (CN)

(72) Inventors: Hao Yan, Beijing (CN); Yongmei Tu, Beijing (CN); Fei Liu, Beijing (CN)

(73) Assignee: ROSENBERGER ASIA PACIFIC ELECTRONIC CO., LTD., Beijing (CN)

( * ) Notice: Subject to any disclaimer, the term of this patent is extended or adjusted under 35 U.S.C. 154(b) by 296 days.

(21) Appl. No.: 18/363,568

(22) Filed: Aug. 1, 2023

(65) Prior Publication Data

US 2023/0378693 A1 Nov. 23, 2023

Related U.S. Application Data

(63) Continuation of application No. PCT/CN2021/098152, filed on Jun. 3, 2021.

(30) Foreign Application Priority Data

Dec. 31, 2020 (CN) ........................ 202011631224.4

(51) Int. Cl.

| | |
|---|---|
| ***H01R 13/639*** | (2006.01) |
| ***H01R 4/48*** | (2006.01) |
| ***H01R 13/502*** | (2006.01) |
| ***H01R 24/54*** | (2011.01) |

(52) U.S. Cl.

CPC ............ *H01R 13/639* (2013.01); *H01R 4/48* (2013.01); *H01R 13/502* (2013.01); *H01R 24/542* (2013.01)

(58) Field of Classification Search

None

See application file for complete search history.

(56) References Cited

FOREIGN PATENT DOCUMENTS

| | | | | |
|---|---|---|---|---|
| CN | 109616840 A * | 4/2019 | .......... | H01R 13/639 |
| WO | WO-2016045054 A1 * | 3/2016 | .......... | H01R 13/639 |

* cited by examiner

*Primary Examiner* — Tho D Ta

(74) *Attorney, Agent, or Firm* — Syncoda LLC; Feng Ma

(57) ABSTRACT

An adapter includes a connector main body, a housing, elastic members, a locking member and an elastic clamping member, wherein the connector main body includes an outer conductor, an inner conductor and an insulator; the housing is arranged on the connector main body in a sleeved manner; a limiting space is formed between the housing and the connector main body; one end of the locking member is movably limited in the limiting space, and the other end of the locking member is provided with extrusion portions; the elastic members are at least partially located in the limiting space; one end of each of the elastic members abuts against a side wall of the limiting space, and the other end of the elastic member abuts against the locking member.

11 Claims, 6 Drawing Sheets

ADAPTER

CROSS-REFERENCE TO RELATED APPLICATIONS

This is a continuation of PCT/CN2021/098152 filed on Jun. 3, 2021, which claims priority to Chinese Patent Application No. 202011631224.4 filed on Dec. 31, 2020. The disclosures of the above-referenced applications are hereby incorporated by reference in their entirety.

BACKGROUND

Cables are essential items in daily life, widely used for signal transmission and power delivery. In some applications, corresponding components such as connectors need to be installed on the cables to form cable assemblies. Cable assemblies include single-ended cable assemblies and double-ended cable assemblies. A single-ended cable assembly refers to a connector installed at one end of the cable, while a double-ended cable assembly refers to connectors installed at both ends of the cable. When cables and cable assemblies are used for signal transmission, there are certain requirements for their physical characteristics and electrical performance. Various tests need to be conducted during use to check if their electrical performance is normal and meets the requirements, such as insulation performance, voltage withstand performance, crosstalk performance, return loss performance, and insertion loss performance.

SUMMARY

The present disclosure relates generally to the field of cable testing technology, particularly to an adapter used for testing the electrical performance of cables and cable assembly.

An object of embodiments of the present disclosure is to overcome the deficiencies of the prior art and provide an adapter that can test cables and cable assemblies without damaging them. It is suitable for testing cables of different models or cable assemblies with components at the end, improving testing efficiency and reducing costs.

To achieve the above purpose, an embodiment of the present disclosure proposes the following technical solution: an adapter, including:

- a connector main body, wherein the connector main body includes an outer conductor, an inner conductor disposed within the outer conductor, and an insulator disposed between the outer conductor and the inner conductor;
- a housing, wherein the housing is arranged on the connector main body in a sleeved manner, a limiting space is formed between the housing and the connector main body;
- a locking member, wherein one end of the locking member is movably limited within the limiting space, and the other end of the locking member is provided with extrusion portions;
- elastic members, wherein the elastic members are at least partially located in the limiting space, one end of each of the elastic members abuts against a side wall of the limiting space, and the other end of the elastic member abuts against the locking member;
- an elastic clamping member, wherein one end of the elastic clamping member is detachably connected to the outer conductor, and the other end of the elastic clamping member is provided with at least two elastic clamping portions, each of the elastic clamping portions is provided with a stop portion;
- wherein the extrusion portions match the stop portions such that the at least two elastic clamping portions to gather towards the center.

Preferably, the extrusion portions extend towards the elastic clamping portions, and the stop portions extend towards the locking member, and both the extrusion portions and the stop portions have smooth surfaces, and the extrusion portions can move along the surface of the stop portions.

Preferably, the outer conductor is provided with an installation hole extending along an axial direction, the installation hole includes a first accommodating hole and a second accommodating hole communicated with each other, and a limited step portion is formed at an intersection of the first accommodating hole and the second accommodating hole, wherein one end of the elastic clamping member is inserted into the first accommodating hole and abuts against the limited step portion.

Preferably, the insulator is inserted into the second accommodating hole and has a through hole, and the inner conductor is inserted into the through hole and detachably connected to the insulator.

Preferably, the locking member has a first assembly hole extending along an axial direction, the first assembly hole including a third accommodating hole and a fourth accommodating hole communicated to each other, and a resistance step portion is formed at an intersection of the third and fourth accommodating holes, the other end of each of the elastic members extends into the third accommodating hole and abuts against the resistance step portion.

Preferably, the elastic members are arranged on the outer conductor in a sleeved manner and are located between the locking member and the outer conductor.

Preferably, the elastic clamping portion is at least partially located in the first assembly hole, and the extrusion portions are compression protrusion formed on an inner wall of the fourth accommodating hole.

Preferably, each elastic clamping portion further has a clearance groove, and when at least two elastic clamping portions gather towards the center, at least two clearance grooves form accommodating spaces.

Preferably, the outer conductor includes a base and an installation protrusion formed by outwardly protruding from the outer side wall of the base, wherein the housing is arranged on the installation protrusion in a sleeve manner and connected to the installation protrusion, and the housing, the installation protrusion, and the base enclose to form a limiting space, wherein one end of each of the elastic members, which is within the limiting space, abuts against the installation protrusion.

Preferably, one end of the locking member is provided with a first limiting protrusion, the first limiting protrusion is located within the limiting space, and the housing is provided with a second limiting protrusion which match the first limiting protrusion to limit one end of the locking member within the limiting space.

Preferably, the adapter further includes a pressing portion provided on the outer side of the locking member.

Preferably, the housing is provided with an installation portion for mounting and fixing the adapter.

Some embodiments of the present disclosure can have one or more of the following advantages:

(1) The adapter of the present disclosure, by adopting a standard RF connector interface design, can connect cables or cable assemblies with components to a standard RF connector interface for electrical performance testing, especially suitable for electrical performance testing of coaxial cables or coaxial cables with components.

(2) The adapter of the present disclosure, by adopting a replaceable component design, i.e., a detachable structure design between the elastic clamping member and the outer conductor, a detachable structure design between the inner conductor and the insulator is provided, which allows for replacement of the elastic clamping member and the inner conductor to connect with cables or cable assemblies (including components) of different models, achieving universality of the testing tool and reducing the design and production cost of the testing tool. At the same time, the internal characteristic impedance of the adapter remains unchanged.

(3) The adapter of the present disclosure, by adopting a quick self-locking structure, i.e., the combination of the outer conductor, the locking element, the elastic clamping member, and the elastic elements, can be inserted into the cable with a small insertion force when pressing the locking element, and the elastic clamping member can hold the outer conductor when releasing the locking element, achieving quick connection between the cable, the cable assembly including components (where the outer diameter of the components may be larger than that of the outer conductor of the cable), and the adapter, improving assembly and testing efficiency while avoiding damage to the cable or cable assembly.

Figure 1:
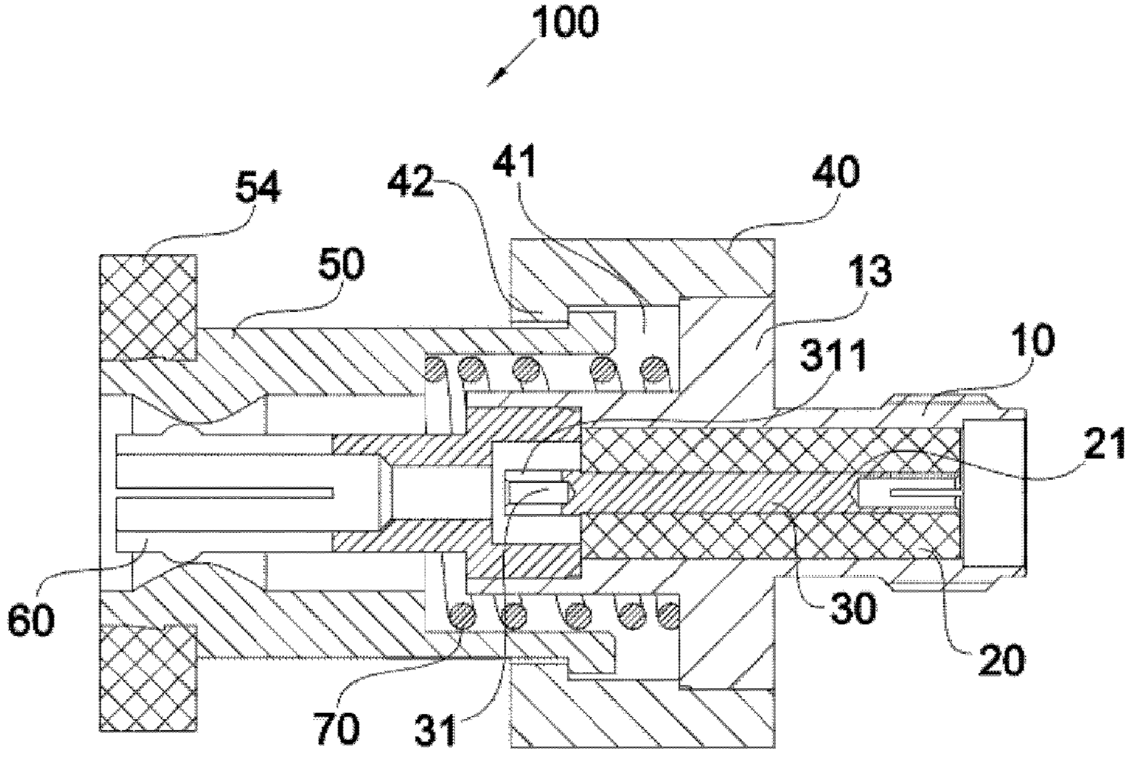
FIG. 1 is a cross-sectional schematic diagram of an adapter according to a first embodiment of the present disclosure.

Reference numerals: 100, adapter; 10, outer conductor; 11, installation hole; 111, first accommodating hole; 112, second accommodating hole; 12, limited step portion; 13, installation protrusion; 20, insulator; 21, through hole; 30, inner conductor; 31, insertion hole; 311, elastic locking element; 40, housing; 41, limiting space; 42, second positioning protrusion; 50, locking member; 50*a*, first end; 50*b*, second end; 51, first assembly hole; 511, third accommodating hole; 512, fourth accommodating hole; 52, resistance step portion; 53, first limiting protrusion; 54, pressing portion; 55, extrusion portion; 60, elastic clamping member; 61, main body; 611, second assembly hole; 612, elastic clamping portion; 613, slot; 614, through hole; 615, stop portion; 616, clearance groove; 617, accommodating space; 70, elastic member; a, cable core; b, insulation medium; c, outer conductor of cable; d, second component.

DETAILED DESCRIPTION

The following text will provide a clear and complete description of the technical solution of the embodiments of the present disclosure, in conjunction with the accompanying drawings of the present disclosure.

When testing cables and cable assemblies, for double-ended cable assemblies, after calibration with corresponding calibration devices, the two ends can be connected to the respective testing equipment to test return loss, insertion loss, and other electrical performances. However, for cables and single-ended cable assemblies, it is not possible to directly obtain accurate electrical performance.

To achieve electrical performance testing of cables and cable assemblies, the commonly used methods are either creating double-ended cable assemblies or using single-ended testing. For the method of creating double-ended cable assemblies, connectors need to be added at both ends of the cable or at the tail end of the single-ended cable assembly (i.e., the end without the corresponding connector) and then removed after testing. The connectors are typically fixed to the cable using destructive methods such as welding or crimping when adding them. This testing method not only easily damages the cable, resulting in low testing efficiency and high costs, but also cannot be applied to cables or single-ended cable assemblies with components at the tail end. Moreover, it introduces measurement errors, leading to measurement results that deviate from the actual results and include certain estimations and errors. For the single-ended testing method, testing equipment such as a network analyzer or time-domain reflectometer (TDR) is usually required to measure return loss. This testing method also involves measurement errors, resulting in measurement results that deviate from the actual results and include certain estimations and errors.

In addition, it is stated in the International Electrotechnical Commission (IEC) standards that adapters can be used for electrical performance testing. However, using adapters for electrical performance testing has the following disadvantages in addition to the aforementioned ones: (1) Different adapters need to be set up to adapt to different cable models, which can easily lead to increased costs; (2) Standard interface adapters cannot be used for electrical performance testing of coaxial cables or single-ended coaxial cable assemblies.

The present disclosure discloses an adapter that, on one hand, adopts a design with replaceable components to accommodate different models of cables, cable assemblies, or cable assemblies with components. On the other hand, it employs a quick self-locking structure design to facilitate fast connection between cables, cable assemblies, or cable assemblies with components and the adapter, avoiding damage to the cables, cable assemblies, or cable assemblies with components and improving assembly efficiency. The adapter of the present disclosure is particularly suitable for situations where the outer diameter of the component on the cable assembly is larger than the outer diameter of the outer conductor of the cable.

The present disclosure discloses an adapter 100, as shown in FIGS. 1 to 6, for testing the electrical performance of cables or cable assemblies. The cable includes cable cores a, insulation medium b, and outer conductor of cable c arranged in a sequence from inner to the outer. The adapter 100 comprises a connector main body, a housing 40, a locking member 50, an elastic clamping member 60, and an elastic member 70. The connector main body includes an outer conductor 10, an insulator 20, and an inner conductor 30. The insulator 20 and the inner conductor 30 are both located inside the outer conductor 10, and the inner conductor 30 is coaxially arranged with the outer conductor 10, with the insulator 20 positioned between the outer conductor 10 and the inner conductor 30. The outer conductor 10 includes a base and an installation protrusion 13 protruding outwardly from the outer side wall of the base. In this embodiment, the installation protrusion 13 is formed as a protruding ring structure extending from the outer side wall of the base. The housing 40 is arranged on the outside of the installation protrusion 13 in a sleeved manner and connected to the installation protrusion 13 by interference fit. In other embodiments, the housing 40 can also be connected to the installation protrusion 13 by a detachable connection. A limiting space 41 is formed among the housing 40, the base of the outer conductor 10, and the installation protrusion 13 of the outer conductor 10. The elastic member 70 is arranged on the outer conductor 10 in a sleeved manner and partially accommodated within the limiting space 41. The locking member 50 is a hollow cylindrical shape and is arranged on the outside of the elastic member 70, with one end of the locking member 50 limited within the limiting space 41, and the other end of the locking member 50 having an inwardly protruding extrusion portion 55. One end of the elastic component 70 is supported against the sidewall of the limiting space 41, while the other end of the elastic component 70 is supported against the locking member 50. The elastic clamping member 60 is placed inside the locking member 50, with one end of the elastic clamping member 60 detachably connected to the outer conductor 10. The other end of the elastic clamping member 60 is equipped with a plurality of elastic clamping portions 612 extending axially, each of the elastic clamping portions has a stop portion 615 that matches the pressing portion 55. The pressing portion 55 matches the stop portion 615 to cause the plurality of elastic clamping sections 612 to gather towards the center. The pressing portion 55 extends towards the elastic clamping sections 612, while the stop portion 615 extends towards the locking member 50. Both the pressing portion 55 and the stop portion 615 have smooth surfaces, and the pressing portion 55 can move along the surface of the stop portion 615.

In operation, press the locking member 50 to move along the axial direction, causing the locking member 50 to extrude the elastic member 70 and compress it. At this time, the extrusion portion 55 no longer acts on the stop portion 615 of the plurality of elastic clamping portions 612, and the plurality of elastic clamping portions 612 are in an expanded state. Further, insert the tested cable or cable assembly into the adapter 100. During the insertion process, the cable core a is inserted into the inner conductor 30, achieving electrical connection between the cable core a and the inner conductor 30 of the adapter. After insertion, release the locking member 50. Under the action of the elastic member 70, the locking member 50 returns to its original position, and the extrusion portion 55 acts on the stop portion 615 of the plurality of elastic clamping portions 612, causing the plurality of elastic clamping portions 612 to gather towards the center, thereby clamping the outer conductor c of the cable and achieving electrical connection between the outer conductor c and the outer conductor 10 of the adapter. After assembling the tested cable or cable assembly into the adapter 100, the cable electrical performance can be tested according to the IEC standard method. After the test is completed, press the locking member 50 again to move it along the axial direction. At this time, the extrusion portion 55 no longer acts on the stop portion 615 of the plurality of elastic clamping portions 612, and the plurality of elastic clamping portions 612 are in an expanded state, allowing the tested cable or cable assembly to be removed.

Figure 2:
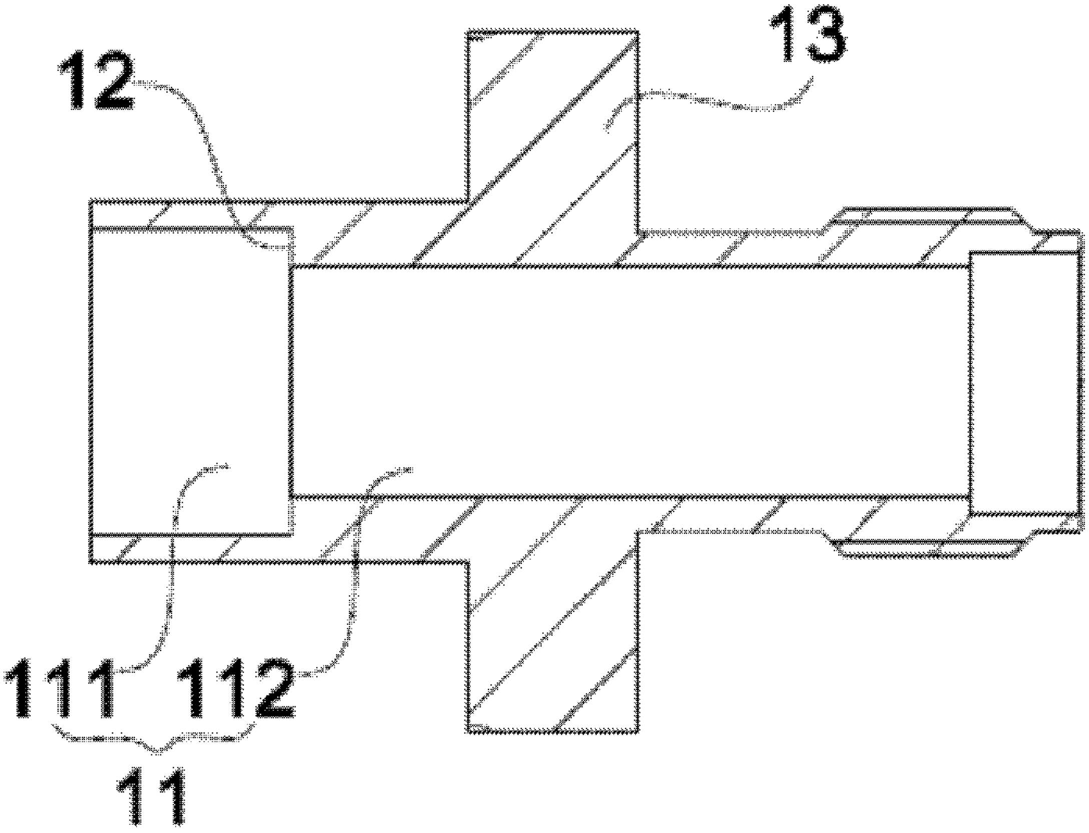
FIG. 2 is a cross-sectional schematic diagram of the outer conductor in FIG. 1.

Referring to FIG. 1 and FIG. 2, the outer conductor 10 is a hollow cylindrical structure, in the outer conductor 10 there is provided an installation hole 11 extending along its axis. The installation hole 11 passes through the outer conductor 10 and includes a first accommodating hole 111 and a second accommodating hole 112 communicated with each other. The inner diameter of the first accommodating hole 111 is larger than that of the second accommodating hole 112, and a limited step portion 12 is formed at the intersection of the first accommodating hole 111 and the second accommodating hole 112. The insulator 20 is a hollow cylindrical structure made of insulating material, which is inserted and fixed in the second accommodating hole 112 of the outer conductor 10. It has a through hole 21 extending along the axis, the through hole 21 passes through the insulator 20. The end face of the insulator 20 is flush with the surface of the limited step portion 12.

Figure 4:
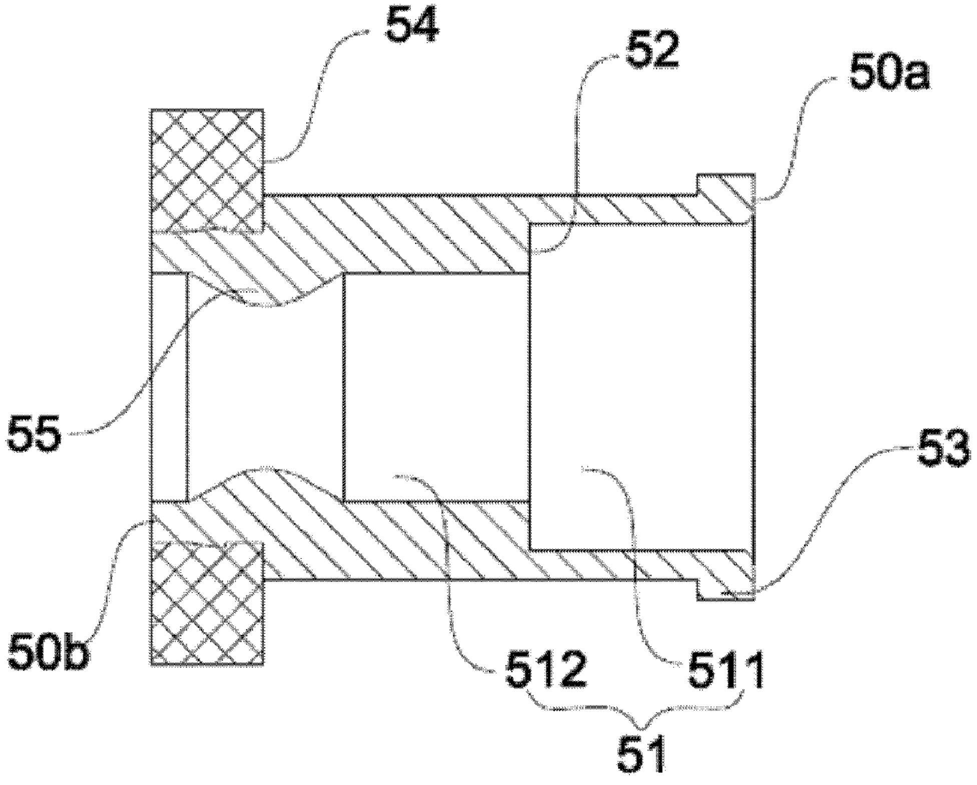
FIG. 4 is a cross-sectional schematic diagram of the locking device in FIG. 1.

Referring to FIG. 4, the elastic clamping member 60 is made of metal material and includes a main body 61. The main body 61 has a second assembly hole 611 extending axially internally. One end of the main body 61 is detachably inserted into the first accommodating hole 111 of the outer conductor 10, and the end portion of the main body 61 abuts against the limiting step portion 12 and the insulator 20 to limit the elastic clamping member 60 and prevent it from moving towards the second accommodating hole 112. The other end of the main body 61 extends axially from its end to form a plurality of elastic clamping portions 612, which form a petal-shaped clamping structure. In other words, the plurality of elastic clamping portions 612 are spaced apart circumferentially along the main body 61, and slots 613 are formed between adjacent elastic clamping portions 612. The plurality of elastic clamping portions 612 have through holes 614 for the passage of cables or cable assemblies. When the elastic clamping member 60 is not subjected to external forces, the plurality of elastic clamping portions 612 of the elastic clamping member 60 are in an expanded state, that is, the cross-sectional area of the through holes 614 formed by the plurality of elastic clamping portions 612 gradually increases in the direction away from the main body 61, facilitating the insertion of cables or cable assemblies. After the cables or cable assemblies are inserted in place, the locking member 50 is released, and the elastic clamping member 60 is subjected to external forces, causing the plurality of elastic clamping portions 612 to continuously gather towards the center, thereby reducing the inner diameter of the through holes 614 and clamping the cables or cable assemblies. With the above structural design of the elastic clamping member 60, the adapter 100 can be connected to cables or cable assemblies.

The inner conductor 30 is a columnar structure, which is inserted and fixed in the through hole 21 of the insulator 20. The inner conductor 30 is detachably connected to the insulator 20, and is coaxially arranged with the outer conductor 10. A portion of the inner conductor 30 is located in the second assembly hole 611 of the main body 61 of the elastic clamping member 60, and the portion located in the second assembly hole 611 is provided with an insertion hole 31. The insertion hole 31 is used for inserting the cable core of the cable to be tested, to achieve electrical connection with the cable or cable assembly.

In this embodiment, the insertion hole 31 is formed by a plurality of elastic locking members 311, that is, a plurality of elastic locking members 311 extend from the end face of the inner conductor 30 in the axial direction, and the plurality of elastic locking members 311 gather towards the center to form the insertion hole 31, which is in a closed state. With this design structure, on one hand, the insertion hole 31 can accommodate cable core slightly larger than the inner diameter of the insertion hole 31, and on the other hand, it facilitates the insertion and removal of the cable core, improving assembly efficiency. In other embodiments, the insertion hole 31 can also be formed by a recess along the axial direction of the end face of the inner conductor 30.

Figure 3:
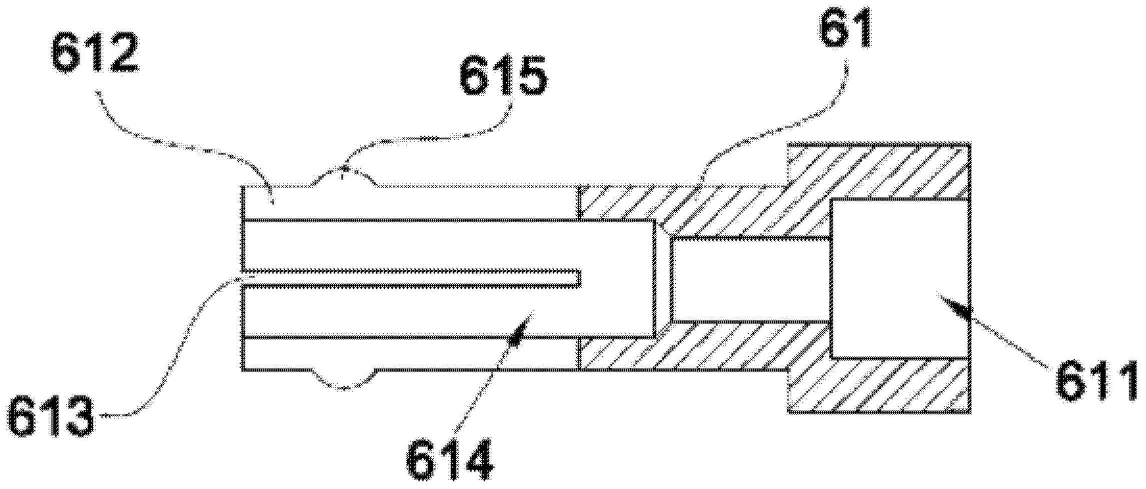
FIG. 3 is a cross-sectional schematic diagram of the elastic clamping member in FIG. 1.

Referring to FIG. 3, the fastener 50 is a hollow cylindrical structure with a first end 50*a* and a second end 50*b* which are opposite to each other. It has a first assembly hole 51 extending along the axial direction, which penetrates through the first end portion 50*a* and the second end portion 50*b*. The first assembly hole 51 includes a third accommodating hole 511 and a fourth accommodating hole 512 communicated to each other. The inner diameter of the third accommodating hole 511 is larger than that of the fourth accommodating hole 512, and a resistance step portion 52 is formed at the intersection of the third accommodating hole 511 and the fourth accommodating hole 512. Specifically, the first end portion 50*a* of the fastener 50 is provided with a first limiting protrusion 53, and the housing 40 is provided with a second limiting protrusion 42 that match the first limiting protrusion 53. Furthermore, an elastic member 70 is located within the limiting space 41 and is arranged on the outside of the outer conductor 10 in a sleeved manner. One end of the elastic member 70 extends into the third accommodating hole 511 and abuts against the resistance step portion 52 to achieve abutment with the fastener 50. The other end of the elastic member 70 is located within the limiting space 41 and abuts against the installation protrusion 13. In other words, the elastic member 70 is positioned between the installation protrusion 13 of the outer conductor 10 and the resistance step portion 52 of the fastener 50. The elastic member 70, on the one hand, is used to provide a restoring force to the fastener 50 after the cable or cable assembly is inserted to allow the fastener 50 to return to its original position, on the other hand, ensures that the fastener 50 is coaxially aligned with the outer conductor 10. With the help of the first limiting protrusion 53 and the second limiting protrusion 42, as well as the action of the elastic member 70, the first end 50*a* of the locking member 50 is limited within the limiting space 41. In operation, an axial force is applied to the locking member 50, allowing it to move a certain distance relative to the outer conductor 10 in the axial direction. Of course, in other embodiments, the elastic member 70 may not extend into the third accommodating hole 511, but directly abut the end portion of the locking member 50, depending on actual needs. The elastic member 70 is preferably a spring, but in other embodiments, other elastic structures such as elastic sheets can be used, depending on actual needs.

The present disclosure achieves the connection between the insulator 20 and the inner conductor 30 in a detachable manner. By adopting a detachable structural design, it facilitates the replacement of the inner conductor 30 and the elastic clamping member 60, allowing compatibility with different types of cables or cable assemblies while maintaining the impedance characteristics of the adapter 100 unchanged. The inner conductor 30, insulator 20, and outer conductor 10 constitute the main body of the connector, which has a standard connector interface. The standard connector interface includes, but is not limited to, SMA/N. By employing a standard connector interface design, the adapter 100 can be used for electrical performance testing of coaxial cables or single-ended coaxial cable assemblies, while still maintaining an internal characteristic impedance of 50 ohms or 75 ohms. The internal characteristic impedance is determined by the radial dimension ratio between the outer conductor 10 and the inner conductor 30 of the adapter 100.

In order to apply a force to the elastic clamping member 60, the locking part 50 also includes a extrusion portion 55 raised and formed on the inner wall of the fourth accommodating hole 512. The elastic clamping portion 612 is located within the first assembly hole 51, and the extrusion portion 55 is used to apply a force to a plurality of elastic clamping portions 612, causing them to gather towards the center and present a closed state. In the initial state, i.e., when the adapter is not in use, the extrusion portion 55 acts on the plurality of elastic clamping portions 612, causing them to gather towards the center and present a closed state. When in use, a force is applied to the locking member 50 in the direction shown in the figure, causing the locking member 50 to move a certain distance relative to the outer conductor 10 along the axial direction. In the meantime, the extrusion portion 55 no longer acts on the plurality of the elastic clamping portions 612, and the plurality of the elastic clamping portions 612 are in an expanded state, facilitating the insertion of cables, cable assemblies, or cable assemblies with components. After the cables, cable assemblies, or cable assemblies with components are inserted into place, the locking member 50 is released, and is reset under the action of the elastic element 70. In the meantime, the extrusion portion 55 once again acts on the plurality of the elastic clamping portions 612, causing them to gather towards the center and clamp the outer conductor c of cable.

Referring to FIG. 3 and FIG. 4, in order to better achieve the abutment of the extrusion portion 55 against the elastic clamping portion 612, the elastic clamping portion 612 is also provided with a stop portion 615 that matches the extrusion portion 55. In this embodiment, the extrusion portion 55 is a extrusion protrusion formed on the inner wall of the fourth accommodating hole 512, and the stop portion 615 is a stop protrusion formed on the outer wall of the elastic clamping portion 612. The extrusion protrusion matches the stop protrusion to convert axial force into radial force, causing the plurality of elastic clamping portions 612 to gather towards the center, to clamp the outer conductor c of cable. Of course, in other embodiments, the extrusion portion 55 may be an extrusion protrusion formed on the inner wall of the fourth accommodating hole 512, while the stop portion 615 may be a stop surface formed on the outer wall of the elastic clamping portion 612, or the extrusion portion 55 may be a extrusion surface formed on the inner wall of the fourth accommodating hole 512, and the stop portion 615 may be a stop protrusion formed on the outer wall of the elastic clamping portion 612. The selection can be made according to actual needs.

As shown in FIG. 1, in order to facilitate the axial force applied to the locking member 50, that is, to facilitate the pressing of the locking member 50, the adapter 100 also includes pressing portions 54 disposed externally to the locking member 50, the pressing portions 54 is preferably adjacent to the second end 50*b* of the locking member 50. In this embodiment, the pressing portion 54 is a convex ring structure and is installed on the locking member 50. In other embodiments, the pressing portions 54 can also be formed directly by protruding outward from the outer wall of the locking member 50. Of course, in other embodiments, the pressing portions 54 can also adopt other structures that can achieve the function of easy pressing, such as lug, and so on.

In order to facilitate the overall installation and fixation of adapter 100, the housing 40 is also equipped with an installation portion (not shown) for installing and fixing the adapter. The installation portion can adopt an installation structure that matches the testing environment, such as a flange structure. That is, the housing 40 is equipped with a flange for fixation, and the adapter 100 is fixed by the flange. Alternatively, a bolt hole structure can be used, where the housing 40 has bolt holes and the housing 40 is fixed by bolts. This allows the adapter 100 to be fixed in a suitable position on the testing panel or other appropriate locations, suitable for different testing environments, thereby improving testing efficiency and ultimately enhancing production capacity and quality.

Figure 7:
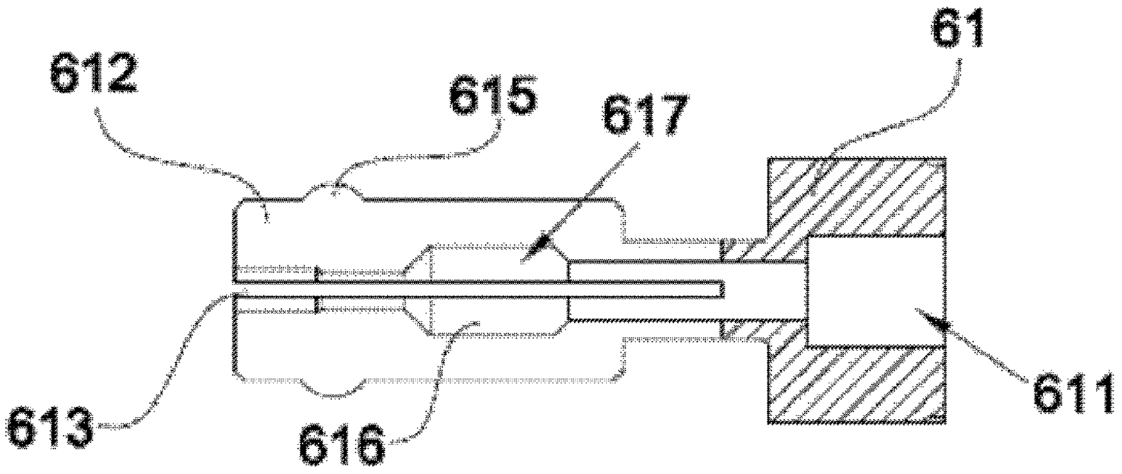
FIG. 7 is a cross-sectional schematic diagram of the elastic clamping member of the adapter according to a second embodiment of the present disclosure.
Figure 8:
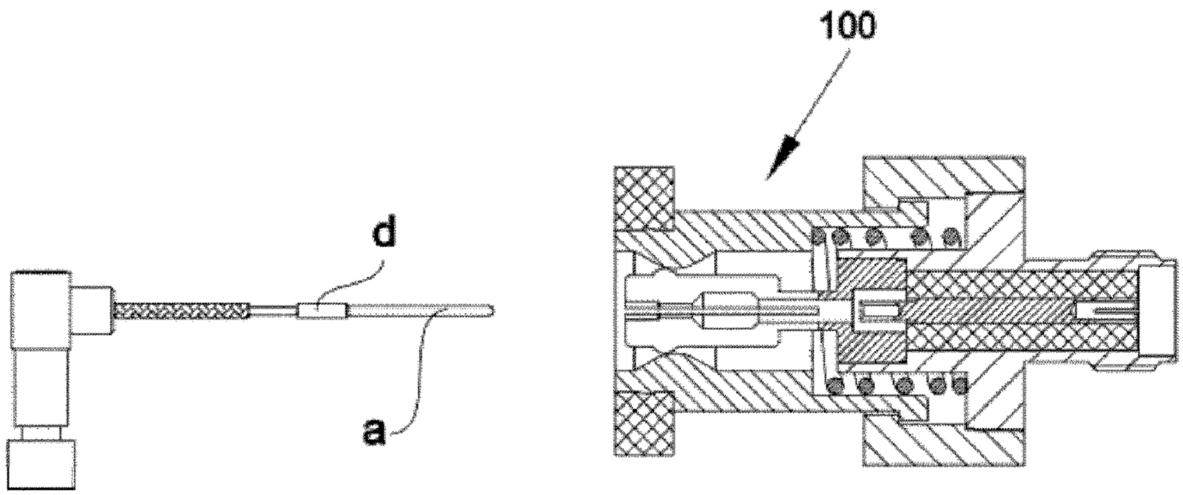
FIG. 8 is a schematic diagram of a cable assembly with components at the tail end and the adapter before connection therebetween.
Figure 9:
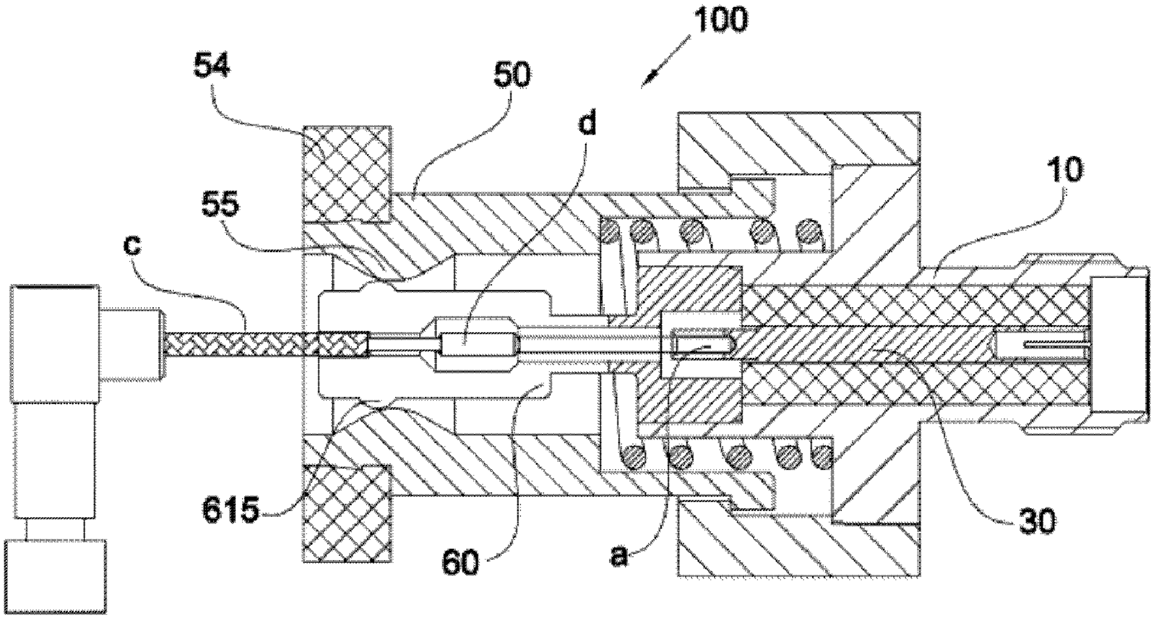
FIG. 9 is a schematic diagram of a cable assembly with components at the tail end and the adapter after connection therebetween.

As shown in FIGS. 7 to 9, the present disclosure discloses a second embodiment of an adapter 100 for electrical performance testing of cable assemblies with components. In order to better clamp the components of the cable assembly, each elastic clamping portion 612 is provided with a clearance groove 616, and the plurality of clearance grooves 616 form an accommodating space 617 for accommodating the components. During operation, depending on the dimensions of the components of the cable assembly to be tested, the cable core to be tested, and the outer conductors of the cable to be tested, the inner conductor 30 and the elastic clamping member 60 are replaced. The elastic clamping member 60 is replaced with an elastic clamping member 60 having a accommodating space 617. The components of the cable assembly are inserted into the accommodating space 617, and the plurality of elastic clamping portions 612 are gathered to tightly clamp the outer conductor c of the cable for electrical connection, while the components are located inside the accommodating space 617. By replacing the inner conductor 30 and the elastic clamping member 60, the clamping of the outer conductor of the cable and the accommodation of the components of the cable assembly can be ensured while maintaining the unchanged characteristic impedance of the adapter. In this embodiment, when the outer diameter of the component is larger than the outer diameter of the outer conductor of the cable, the plurality of elastic clamping portions 612 form an expanded state to accommodate the insertion of the component.

With reference to FIGS. 5, 6, 8, and 9, this text provides a detailed explanation of how the adapter 100 connects to the single-ended cable assembly, double-ended cable, and cable assembly with components at the tail end, using three implementation examples.

Example 1

Figure 5:
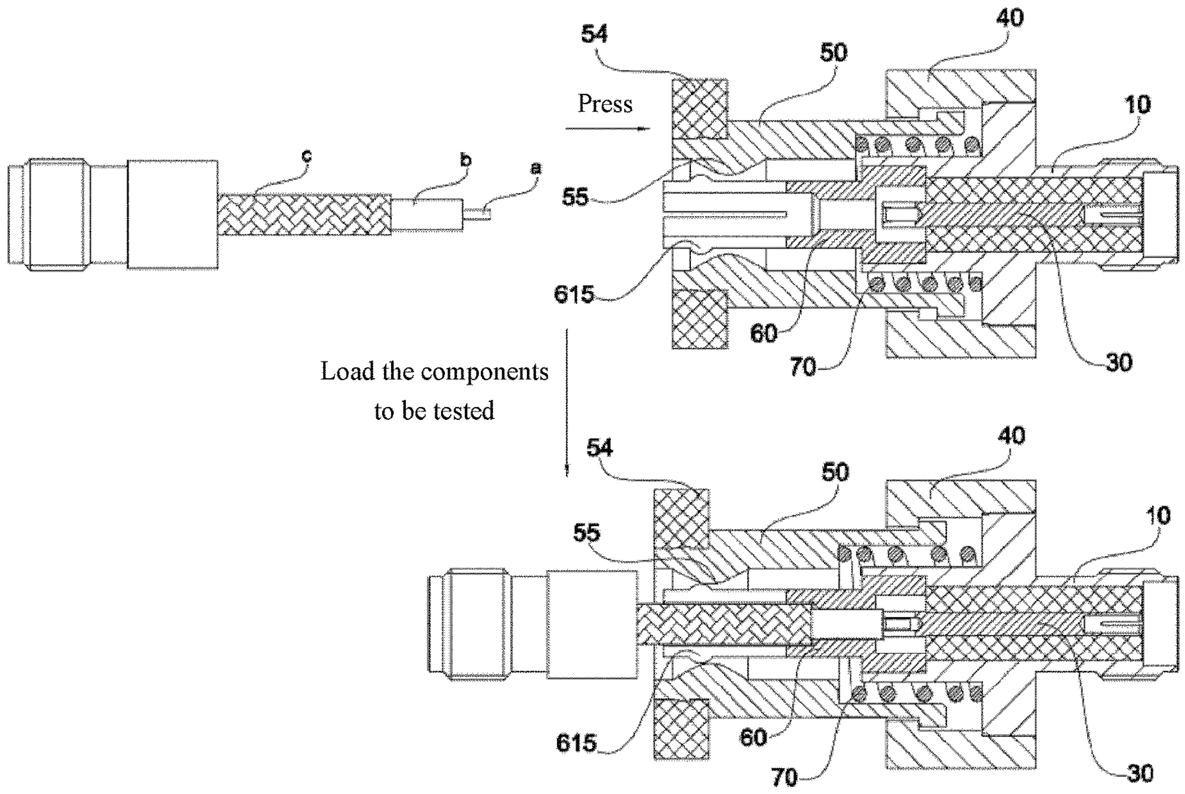
FIG. 5 is a schematic diagram of the connection between a single-ended cable assembly and the adapter.

As shown in FIG. 5, a single-ended cable assembly includes a cable and a connector connected to one end of the cable. Before the single-ended cable assembly is matched with the adapter 100, the docking end of the cable, which is the end not connected to the connector, needs to be processed to explore the cable core a, the outer conductor c of the cable, and the insulation medium b located between the outer conductor c of the cable and the cable core a. When connecting the adapter 100, press the pressing portion 54 on the outer side of the locking member 50 to make the locking member 50 move in the axial direction. The locking member 50 extrudes the elastic member 70, compressing the elastic member 70. In the meantime, the extrusion portion 55 no longer acts on the stop portion 615 of the plurality of the elastic clamping portions 612, and the plurality of the elastic clamping portions 612 are in an expanded state. Further, the cable needs to be inserted, during the process of inserting the cable into the adapter 100, the cable core a passes through the through hole 614, the assembly hole 611, and then inserts into the insertion hole 31 of the inner conductor 30, achieving electrical connection with the inner conductor 30. After the insertion is completed, release the locking member 50, and the locking member 50 resets under the action of the elastic member 70. The plurality of elastic clamping portions 612 gather towards the center to clamp the outer conductor c of the cable, achieving electrical connection between the outer conductor c of the cable and the outer conductor 10 of the adapter. The cable electrical performance can be tested according to the IEC standard method. After the test is completed, press the pressing portion 54 on the outer side of the locking member 50 again, making the locking member 50 move in the axial direction. In the meantime, the extrusion portion 55 no longer acts on the stop portion 615 of the plurality of elastic clamping portions 612, and the plurality of elastic clamping portions 612 are in an expanded state, allowing the cable to be removed.

Example 2

Figure 6:
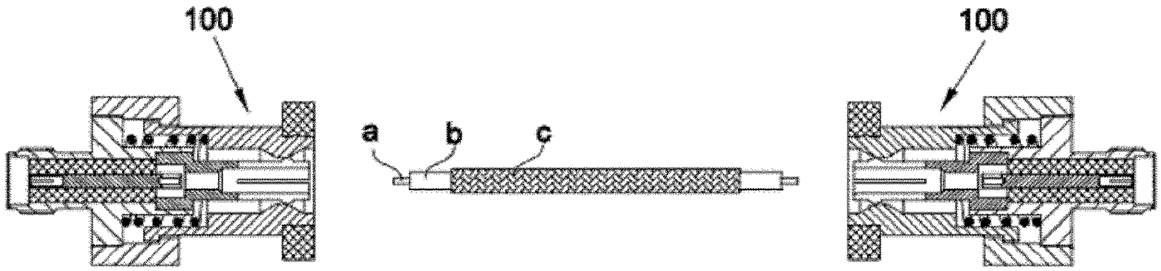
FIG. 6 is a schematic diagram of the connection between a double-ended cable and the adapter.

As shown in FIG. 6, the two ends of the cable are processed to explore cable core a, the outer conductor c of the cable, and insulation medium b located between the outer conductor of the cable and the cable core. The process of connecting the cable to the adapter 100 is detailed in Example 1 and will not be repeated here. For larger-sized cables such as 141 cable, 250 cable, or ½ feeder lines, the only adjustment needed is to resize the inner conductor 30 of the adapter and the dimensions of the elastic clamp member 60 to fit the aforementioned cables, without changing the structure and working principle of the adapter.

Example 3

Referring to FIGS. 8 and 9, the cable assembly with components at the tail end includes a cable, a first component, and a second component d. The second component d is arranged at the tail end of the cable, the outer diameter of the second component d is larger than that of the outer conductor c of the cable. The second component d is a conductor that can be arranged to the tail end of the cable through welding. Prior to connecting adapter 100, the inner conductor 30 and the elastic clamping member 60 in the adapter 100 are replaced. The elastic clamping member 60 is replaced with an elastic clamping member that has accommodating space. When connecting the adapter 100, the pressing portion 54 on the outer side of the locking member 50 is pressed, causing the locking member 50 to move axially and compress the elastic element 70. The elastic element 70 is compressed. In the meantime, the pressing portion 55 no longer acts on the plurality of elastic clamping portions 612, and the plurality of elastic clamping portions 612 are in an expanded state. The cable assembly with components is further inserted, and during the insertion process of the cable assembly with components into adapter 100, the cable core a passes through the through hole 614, the accommodating space 617, and the assembly hole 611, then the cable core inserts into the insertion hole 31 of the inner conductor 30, achieving electrical connection with the inner conductor 30 of the adapter. After the cable core a is properly inserted, the second component d is located in the accommodating space 617. The locking member 50 is then released, and is reset under the action of the elastic element 70, causing the plurality of the elastic clamping portions 612 to gather towards the center and ultimately clamp the outer conductor c of the cable to achieve electrical connection. The second component d remains in the accommodating space 617. After assembling the adapter 100, the electrical performance of the cable assembly with components at the tail end can be tested according to IEC standard methods. After the test is completed, the pressing portion 54 is pressed again, causing the locking member 50 to move axially. In the meantime, the pressing portion 55 no longer acts on the plurality of the elastic clamping portions 612, and the plurality of the elastic clamping portions 612 are in an expanded state, allowing the cable assembly with the second component d to be removed from the adapter.

The adapter 100 described herein, firstly, by adopting a standard connector interface design, can connect cables, cable assemblies, or cable assemblies with components to a standard RF connector interface, realizing electrical performance testing, especially suitable for electrical performance testing of coaxial cables, coaxial cable assemblies, or coaxial cable assemblies with components, such as measuring insertion loss, return loss, and intermodulation, etc. Secondly, by adopting a design of replaceable components, namely, a detachable structure design between the elastic clamp member 60 and the outer conductor 10, and a detachable structure design between the inner conductor 30 and the insulator 20, the elastic clamp member 60 and the inner conductor 30 can be replaced, enabling connection with cables, cable assemblies, and cable assemblies with components of different models, achieving the generalization of the testing tool, reducing the design and production cost of the testing tool, and also maintaining the internal characteristic impedance of the adapter unchanged. Finally, by adopting a quick self-locking structure, namely, the cooperation among the outer conductor 10, the locking member 50, the elastic clamp member 60, and the elastic member 70, the cable, cable assembly, or cable assembly with components can be quickly connected to the adapter with a small insertion force when pressing the locking member 50, and the elastic clamp member 60 can clamp the outer conductor c of the cable when releasing the locking member 50, realizing a fast connection between the cable, cable assembly, or cable assembly with components (the outer diameter dimension of the second component d can be larger than the outer diameter dimension of the outer conductor c of the cable) and the adapter, improving assembly efficiency and testing efficiency while avoiding damage to the cable or cable assembly.

Various technical content and features of the present disclosure have been disclosed as above. However, those skilled in the art may still make various substitutions and modifications that do not depart from the spirit of the present disclosure based on the teachings and disclosures of the present disclosure. Therefore, the scope of protection of the present disclosure should not be limited to the content disclosed in the embodiments, but should include various substitutions and modifications that do not depart from the present disclosure, as covered by the claims of the application.

What is claimed is:

1. An adapter, comprising:

a connector main body, wherein the connector main body comprises an outer conductor, an inner conductor disposed within the outer conductor, and an insulator disposed between the outer conductor and the inner conductor;

a housing, wherein the housing is arranged on the connector main body in a sleeved manner, a limiting space is formed between the housing and the connector main body;

a locking member, wherein one end of the locking member is movably limited within the limiting space, and the other end of the locking member is provided with extrusion portions;

elastic members, wherein the elastic members are at least partially located in the limiting space, one end of each of the elastic members abuts against a side wall of the limiting space, and the other end of the elastic member abuts against the locking member; and an elastic clamping member, wherein one end of the elastic clamping member is detachably connected to the outer conductor, and the other end of the elastic clamping member is provided with at least two elastic clamping portions, each of the elastic clamping portions is provided with a stop portion;

wherein the extrusion portions match the stop portions such that the at least two elastic clamping portions to gather towards a center of the at least two elastic clamping portions;

wherein the outer conductor is provided with an installation hole extending along an axial direction, the installation hole comprises a first accommodating hole and a second accommodating hole communicated with each other, and a limited step portion is formed at an intersection of the first accommodating hole and the second accommodating hole, wherein one end of the elastic clamping member is inserted into the first accommodating hole and abuts against the limited step portion.

2. The adapter of claim 1, wherein the extrusion portions extend towards the elastic clamping portions, and the stop portions extend towards the locking member, and both the extrusion portions and the stop portions have smooth surfaces, and the extrusion portions can move along the surface of the stop portions.

3. The adapter of claim 1, wherein the insulator is inserted into the second accommodating hole and has a through hole, and the inner conductor is inserted into the through hole and detachably connected to the insulator.

4. The adapter of claim 1, wherein each elastic clamping portion further has a clearance groove, and when at least two elastic clamping portions gather towards the center, at least two clearance grooves form accommodating spaces.

5. The adapter of claim 1, wherein the outer conductor comprises a base and an installation protrusion formed by outwardly protruding from the outer side wall of the base, wherein the housing is arranged on the installation protrusion in a sleeve manner and connected to the installation protrusion, and the housing, the installation protrusion, and the base enclose to form a limiting space, wherein one end of each of the elastic members, which is within the limiting space, abuts against the installation protrusion.

6. The adapter of claim 1, wherein one end of the locking member is provided with a first limiting protrusion, the first limiting protrusion is located within the limiting space, and the housing is provided with a second limiting protrusion which match the first limiting protrusion to limit one end of the locking member within the limiting space.

7. The adapter of claim 1, wherein the adapter further comprises a pressing portion provided on the outer side of the locking member.

8. The adapter of claim 1, wherein the housing is provided with an installation portion for mounting and fixing the adapter.

9. The adapter of claim 1, wherein the locking member has a first assembly hole extending along an axial direction, the first assembly hole comprising a third accommodating hole and a fourth accommodating hole communicated to each other, and a resistance step portion is formed at an intersection of the third and fourth accommodating holes, the other end of each of the elastic members extends into the third accommodating hole and abuts against the resistance step portion.

10. The adapter of claim 9, wherein the elastic members are arranged on the outer conductor in a sleeved manner and are located between the locking member and the outer conductor.

11. The adapter of claim 9, wherein the elastic clamping portion is at least partially located in the first assembly hole, and the extrusion portions are compression protrusion formed on an inner wall of the fourth accommodating hole.

* * * * *